(12) United States Patent
Zhan et al.

(10) Patent No.: US 9,078,142 B1
(45) Date of Patent: Jul. 7, 2015

(54) METHOD AND APPARATUS TO DECOUPLE LINK ADAPTATION AND TRANSMIT BEAMFORMING IN WIFI SYSTEMS

(71) Applicant: Quantenna Communications, Inc., Fremont, CA (US)

(72) Inventors: Pengcheng Zhan, San Jose, CA (US); Hossein Dehghan, Diablo, CA (US)

(73) Assignee: Quantenna Communications Inc., Fremont, CA (US)

( * ) Notice: Subject to any disclaimer, the term of this patent is extended or adjusted under 35 U.S.C. 154(b) by 278 days.

(21) Appl. No.: 13/897,431

(22) Filed: May 19, 2013

Related U.S. Application Data

(60) Provisional application No. 61/809,825, filed on Apr. 8, 2013.

(51) Int. Cl.
*H04W 4/00* (2009.01)
*H04W 16/28* (2009.01)

(52) U.S. Cl.
CPC ..................... *H04W 16/28* (2013.01)

(58) Field of Classification Search
CPC ..................... H04L 27/2607; H04L 5/005
USPC ..................... 370/328–339; 375/260–267
See application file for complete search history.

(56) References Cited

U.S. PATENT DOCUMENTS

2013/0294533 A1* 11/2013 Kim et al. ............ 375/260
2014/0334420 A1* 11/2014 You et al. ............ 370/329

* cited by examiner

*Primary Examiner* — Iqbal Zaidi
(74) *Attorney, Agent, or Firm* — IP Creators; Charles C Cary

(57) ABSTRACT

A link optimizer for optimizing a link on a wireless local area network (WLAN). The link optimizer includes: a sounding distender, a beamform matrix derivation module, and a link dimension attenuator. The sounding distender send a sounding packet exclusively at a maximum number of streams and at a maximum bandwidth supported by the link and receives a MIMO feedback beamforming matrix in response. The beamform matrix derivation module derives from the received MIMO feedback beamforming matrix a set of derived MIMO beamforming matrices having at least a column dimension less than a column dimension in the feedback beamforming matrix. The link dimension attenuator selects at least one of the derived beamforming matrices for transmission of subsequent communication packets, thereby avoiding a requirement for additional channel sounding.

18 Claims, 6 Drawing Sheets

Method for WLAN Link Optimization

Training Symbols for Each Stream

400

Modulation and Coding Table

| Spatial Streams | Modulation Type | Coding Rate | Bandwidth Specific Parameters |
|---|---|---|---|
| 1 | BPSK | ½ | |
| 1 | QPSK | ½ | |
| 1 | QPSK | ¾ | |
| 1 | 16-QAM | ½ | |
| 1 | 16-QAM | ¾ | |
| 1 | 64-QAM | 2/3 | |
| 1 | 64-QAM | ¾ | |
| 1 | 64-QAM | 5/6 | |
| 2 | BPSK | ½ | |
| 2 | ... | ... | |
| 2 | ... | ... | |
| 2 | ... | ... | |
| 2 | ... | ... | |
| 2 | ... | ... | |
| 7 | ... | ... | |
| 7 | ... | ... | |
| 7 | ... | ... | |
| 7 | ... | ... | |
| 7 | ... | ... | |
| 7 | ... | ... | |
| 7 | ... | ... | |
| 8 | ... | ... | |
| 8 | ... | ... | |
| 8 | ... | ... | |

450

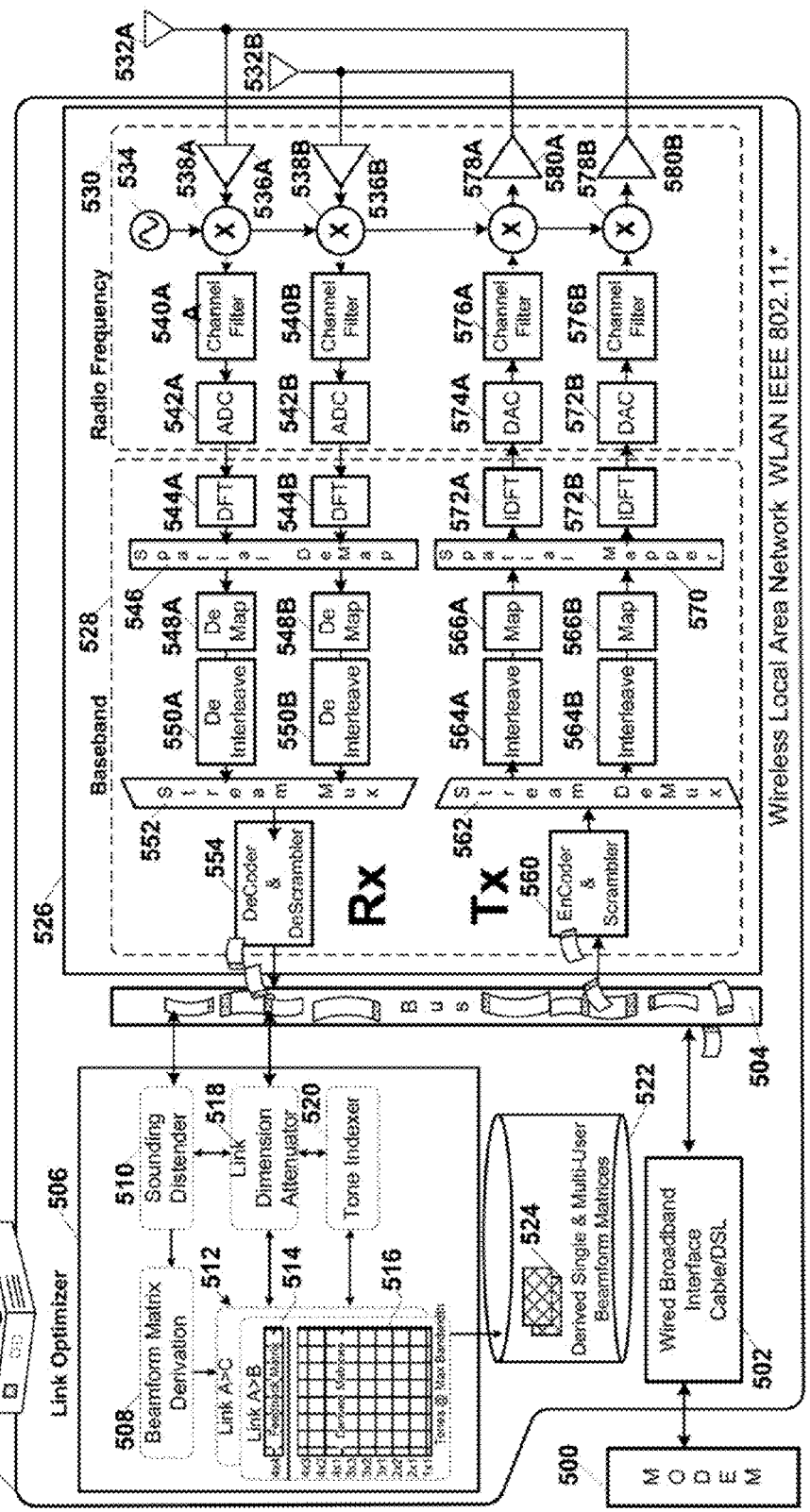

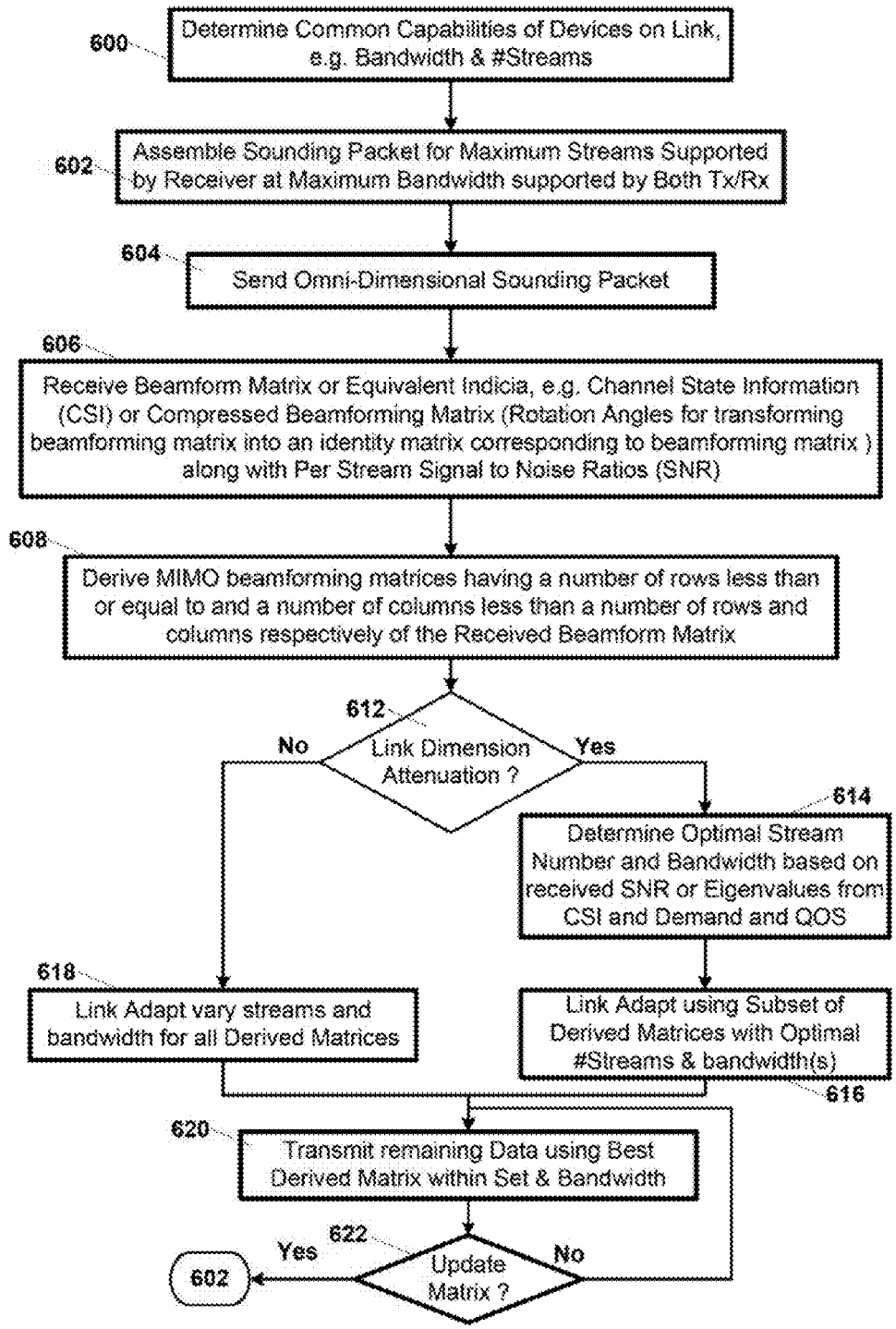
Method for WLAN Link Optimization  FIG. 6

METHOD AND APPARATUS TO DECOUPLE LINK ADAPTATION AND TRANSMIT BEAMFORMING IN WIFI SYSTEMS

CROSS REFERENCE TO RELATED APPLICATION

This application claims the benefit of prior filed Provisional Applications No. 61/809,825 filed on Apr. 8, 2013 entitled "Method and Apparatus to Decouple Link Adaptation and Transmit Beamforming in WiFi Systems" which are incorporated herein by reference in their entirety as if fully set forth herein.

BACKGROUND OF THE INVENTION

1. Field of Invention

The field of the present invention relates in general to wireless local area networks (WLAN) including wireless access points (WAP) and wireless stations and methods for optimizing links on same.

2. Description of the Related Art

Home and Office networks, a.k.a. wireless local area networks (WLAN) are increasingly set up and serviced using a device called a Wireless Access Point (WAP). The WAP may include a router. The WAP couples all the devices of the home network, e.g. wireless stations such as: computers, printers, televisions, digital video (DVD) players and smoke detectors to one another and to the Cable or Subscriber Line through which Internet, video, and television is delivered to the home. Most WAPs implement the IEEE 802.11 standard which is a contention based standard for handling communications among multiple competing devices for a shared wireless communication medium on a single channel. Each home has a WAP which forms the center piece of the associated wireless networking between all the wireless enabled devices in the home, a.k.a. wireless stations or wireless network nodes. The WAP self-selects one of a number of frequency division multiplexed channels on which its network nodes or devices will communicate.

After selection of a single channel for the associated home network, the WAP controls access to the shared communication medium using a multiple access methodology identified as Carrier Sense Multiple Access (CSMA). CSMA is a distributed random access methodology first introduced for home wired networks such as Ethernet for sharing a single communication medium, by having a contending communication link back off and retry access to the line if a collision is detected, i.e. if the line is in use.

Communications on the single communication medium are identified as "Simplex" meaning, one communication stream from a single source node to one or more target nodes at one time, with all remaining nodes capable of "listening" to the subject transmission. To confirm arrival of each communication packet, the target node is required to send back an acknowledgment, a.k.a. "ACK" packet to the source. Absent the receipt of the ACK packet the source will retransmit the unacknowledged data until an acknowledgement is received, or a time-out is reached.

To improve the throughput on each point-to-point link between a WAP and a station, multiple antennas may be used. Devices with multiple antennas can exploit any of a number of techniques to increase link throughput specifically: a) controlling how data is loaded on to each antenna, b) how data is coded, and c) how the antennas signals are aimed at the receiving station. Typically, during an association phase the transmitting and receiving device identify their capabilities and agree on a compatible, i.e. common denominator, set of loading, coding and aiming options after which communications are initiated on the link.

What is needed is an improved method of operating a WLAN.

SUMMARY OF THE INVENTION

The present invention provides a method and apparatus for optimizing a link on a wireless local area network (WLAN), supporting wireless communications between a multiple-input multiple-output (MIMO) wireless access point (WAP) node and associated MIMO station nodes on a selected one of a plurality of communication channels. In an embodiment of the invention the link optimizer apparatus comprises: a sounding distender, a beamform matrix derivation module, and a link dimension attenuator. The sounding distender is configured to send from a transmitting one of the nodes to a receiving one of the nodes at least one sounding packet assembled to sound a communication channel link there between exclusively at a maximum number of streams and at a maximum bandwidth supported by the nodes; and further configured to receive in response from the receiving one of the nodes a MIMO feedback beamforming matrix or equivalent indicia characterizing the communication channel there between. The beamform matrix derivation module is configured to derive from the received MIMO feedback beamforming matrix a set of derived MIMO beamforming matrices having at least a column dimension less than a column dimension in the feedback beamforming matrix. The link dimension attenuator is configured to select at least one of the derived beamforming matrices from the beamform matrix derivation module for transmission of subsequent communication packets from the MIMO transmitter one of the nodes to the recipient one of the nodes, thereby avoiding a requirement for additional channel sounding at either a number of streams or a bandwidth associated with the transmission of subsequent communication packets.

The invention may be implemented in hardware, firmware or software.

Associated methods are also claimed.

BRIEF DESCRIPTION OF THE DRAWINGS

These and other features and advantages of the present invention will become more apparent to those skilled in the art from the following detailed description in conjunction with the appended drawings in which:

FIG. 5 is a hardware block diagram showing a WLAN node, in this case a wireless access point (WAP) in accordance with an embodiment of the invention; and FIG. 6 is a process flow diagram of processes associated with WLAN link optimization.

DETAILED DESCRIPTION OF THE EMBODIMENTS

The present invention provides a method and apparatus for optimizing link throughput in wireless local area networks (WLAN) having multi-input multi-output wireless devices with multiple antenna and which support beamforming. Omni-dimensional sounding and support for derivation from the feedback matrix of derived matrices spanning a range of: antenna; stream and bandwidth selections, allows a single omni-dimensional sounding to replace multiple legacy sounding cycles to reduce the latency associated with establishing and maintaining a wireless communication link.

Figure 1:
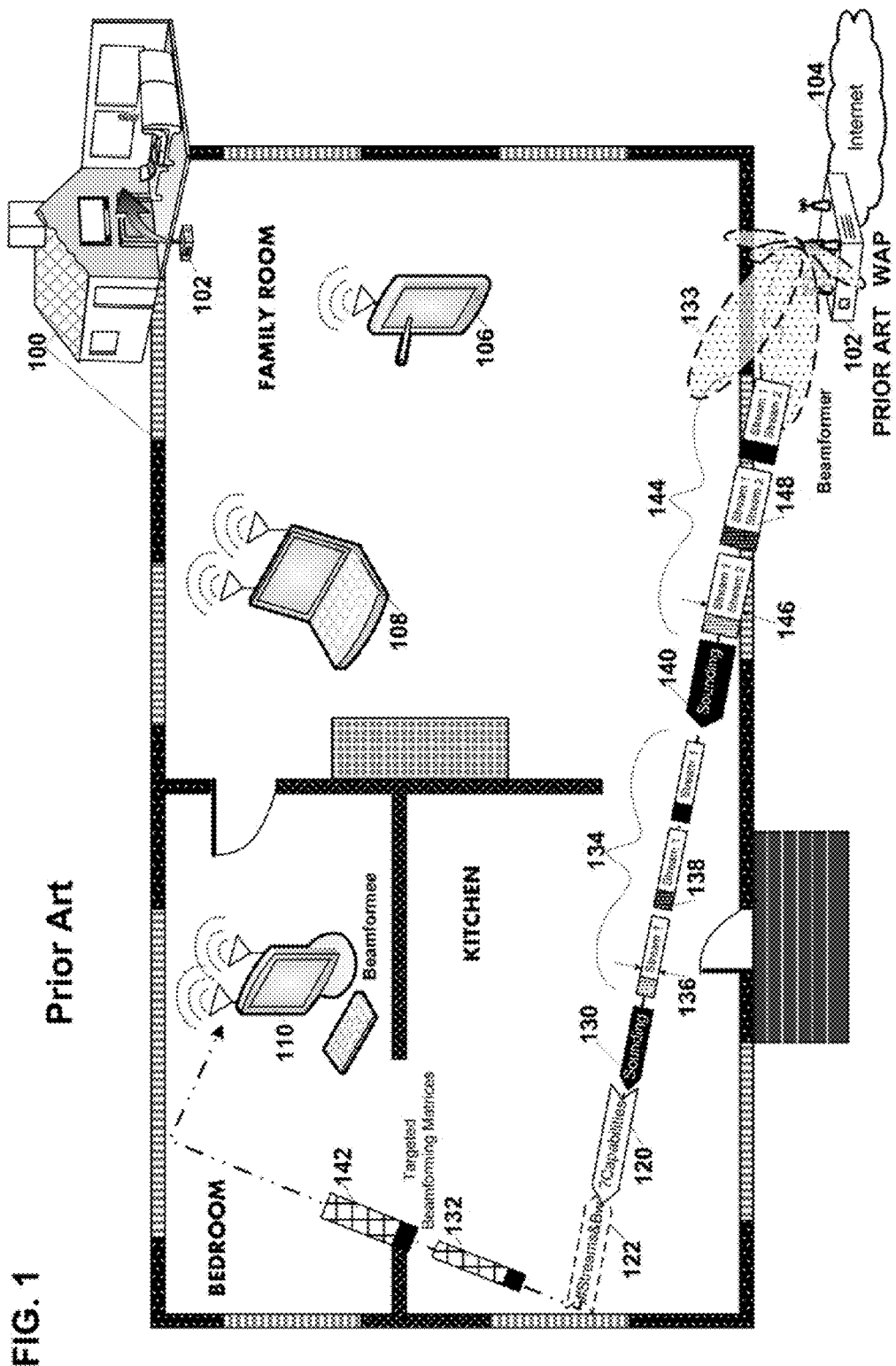
FIG. 1 is a network diagram showing a wireless local area network (WLAN) in a home using a prior art approach to link optimization.

FIG. 1 is a network diagram showing a wireless local area network (WLAN) in a home using a prior art approach to communicate with a wireless device. A home 100 is shown with station nodes 106, 108, 110 provided with networking and wireless Internet 104 access by prior art wireless access point (WAP) node 102. The WAP may support any of a number of standards within the IEEE 802.11 family. In the example shown WAP supports beamforming as specified by IEEE 802.11n standard for example, requiring for its practice the support by both sending and receiving device for beamforming, including identifying mutual beamforming support in the capabilities exchange, followed by further cooperative channel calibration or channel characterization, or beamforming matrix determinations carried out by the sending and receiving parties as shown in FIG. 1.

In FIG. 1 a simplex communication link between WAP 102 and station 110 is shown. In FIG. 1 the prior art WAP 102 initiates establishment of a link with station 110 which supports beamforming. In the capabilities exchange (120-122) the WAP and station determine the mutually supported number of communication streams and the bandwidth of the link. Next the WAP makes an initial determination as to the number of streams to transmit and the bandwidth of the transmission. The WAP then sends a sounding packet 130 with the requisite bandwidth and training symbols corresponding to the number of streams to be characterized. These sounding packets are specified in the associated standard such as: IEEE 802.11n and other standards. The sounding packet allows the receiving station 110 to calculate the beamforming matrix required for transmissions across the link at the bandwidth and stream count established by the sounding packet. In response to the sounding packet, the recipient station 110 sends this targeted beamforming matrix 132 or equivalent indicia such as a channel matrix to the WAP 102. The WAP uses the received beamforming matrix to initiate data communications with the station 110 including beamformed data packets 134 at the target parameters, i.e. bandwidth and # of streams.

Link adaptation is evidenced by the variations in modulation and coding schemes (MCS) imposed by the WAP on transmitted packets, all at the sounded bandwidth with receipt acknowledgement used to determine the best mix of MCS parameters for subsequent communication. Graphically the height of a packet, e.g. 136, corresponds to its bandwidth, and the variations in color/pattern in the packet header, e.g. 138, corresponds to MCS variations therein.

Typically, prior art WAPS start with limited channel knowledge and will not likely, therefore, initially choose an acceptable bandwidth or stream count for communications. Re-sounding of the channel will therefore be required. FIG. 1 shows such a case represented by resounding packet 140. That packet has a wider bandwidth and higher stream count than the prior sounding packet 130. In response to the re-sounding packet, the recipient station 110 sends a second targeted beamforming matrix 142 or equivalent indicia such as a channel matrix to the WAP 102. The WAP uses the received beamforming matrix to further adapt data communications with the station 110 including beamformed data packets 140 at the revised target parameters, i.e. bandwidth and # of streams. Graphically the height of each data packet, e.g. 146, corresponds to its bandwidth, and the variations in color/pattern in the packet header, e.g. 148, corresponds to MCS variations therein. Typically, after repeated soundings, and attendant delays the stream count, bandwidth, and MCS parameters of the resultant communications offer a reasonable match with the channel characteristics determined through repeated probing. After a sufficient number of soundings/re-soundings the beamforming matrix from the station 110 is used to establish an aggregate signal radiation pattern 133 formed by the four antennas on WAP 102 which exhibits prominent lobes with a high degree of directionality, thereby improving throughput over the link between beamformer WAP 102 and beamformee station 110.

Figure 2:
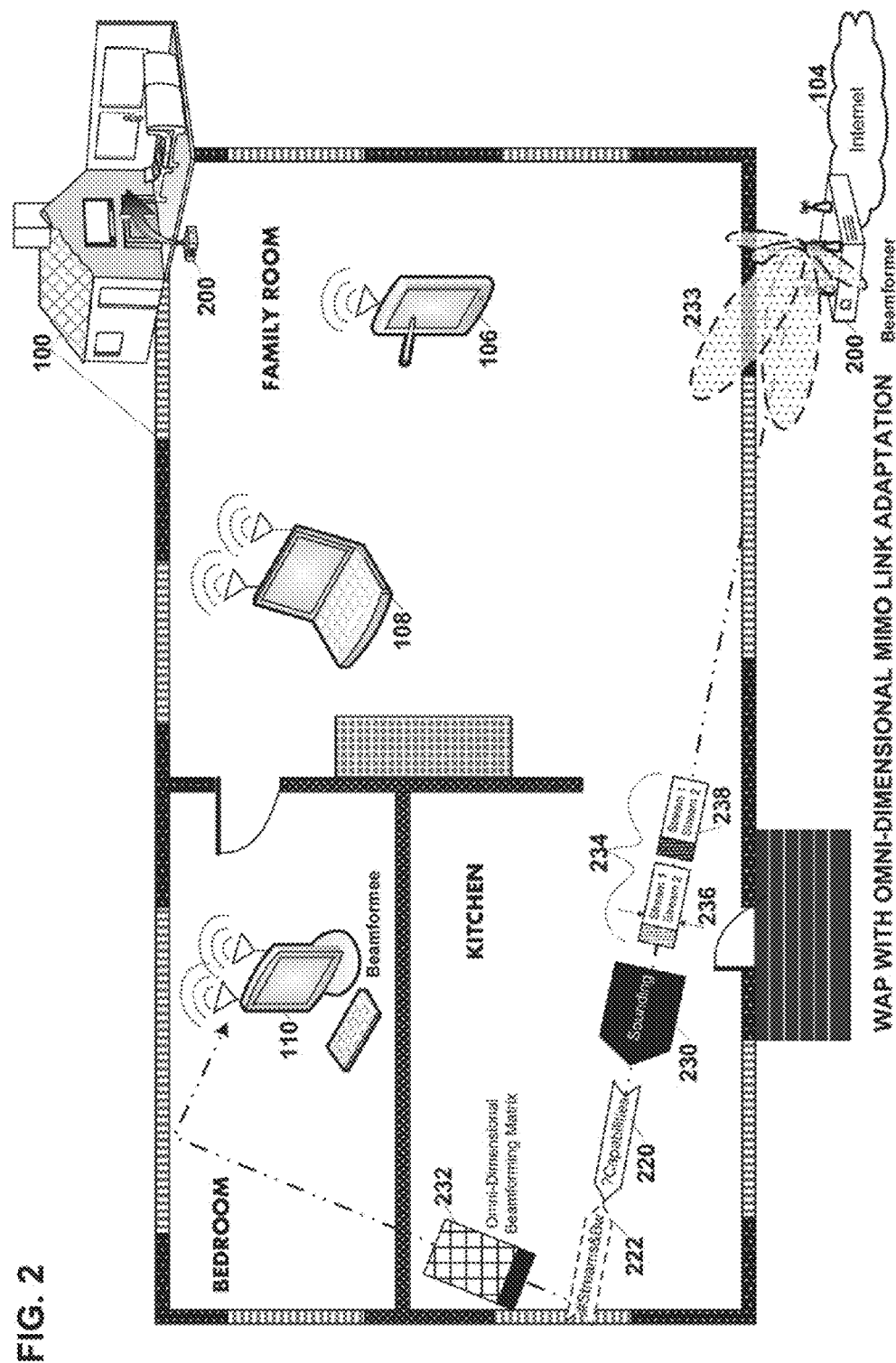
FIG. 2 is a network diagram of the WLAN shown in FIG. 1 showing an embodiment of the invention in which omni-dimensional link optimization is supported.

FIG. 2 is a network diagram of the WLAN shown in FIG. 1 showing an embodiment of the invention in which omni-dimensional link optimization is supported. The WAP 200 has multiple antennas, e.g. four, and also includes support for omni-dimensional MIMO link adaptation. Omni-dimensional link adaptation includes both: Omni-dimensional sounding as well as support for derivation from the feedback matrix of derived matrices spanning a range of: antenna; stream and bandwidth selections. This combined capability allows a single omni-dimensional sounding to replace multiple legacy sounding cycles to reduce the latency associated with establishing and maintaining a wireless communication link and to improve the efficiency of the link by rapidly obtaining a more thorough characterization of the link.

Omni-dimensional MIMO link adaptation between the WAP 200 and the station 110 is shown in FIG. 2. In the capabilities exchange 220-222 the WAP and station determine the mutually supported number of communication streams and the bandwidth of the link. Next the WAP determines the maximum number of streams and the maximum bandwidth mutually supported by the WAP 200 and the station 110. The WAP then sends an omni-dimensional sounding packet 230 with the requisite bandwidth to span the maximum mutually supported bandwidth and training symbols corresponding to the maximum number of streams mutually supported by the sending and receiving node. The sounding packet allows the receiving station 110 to calculate the beamforming matrix required for transmissions across the link at the maximum bandwidth and maximum stream count established by the sounding packet. In response to the sounding packet, the recipient station 110 sends this omni-dimensional beamforming matrix 232 or equivalent indicia such as a channel matrix, or compressed beamforming matrix to the WAP 102. The WAP uses the received omni-dimensional beamforming matrix, or equivalent indicia, to derive a set of derived MIMO beamforming matrices spanning all antenna, stream, and bandwidth combinations potentially supportable on the link. The WAP selects one among the derived MIMO beamforming matrices for subsequent transmissions at an optimal: stream count and bandwidth, both typically significantly less than the stream count and/or bandwidth associated with the omni-dimensional sounding packet 230.

Criteria used in making such derived beamforming matrix selection include: signal-to-noise ratios for each stream, demand associated with the communication data type, and quality-of-service (QOS) requirements for the communication data. Once the selected one of the derived matrices is loaded subsequent communications are subject to spatial mapping and attendant beamforming associated by the derived matrix. Highly targeted aggregate beamforming radiation pattern 233 is shown.

Link adaptation is evidenced by the variations in modulation and coding schemes (MCS) imposed by the WAP on transmitted packets 234, all typically well below the sounded bandwidth with receipt acknowledgement used to determine the best mix of MCS parameters for subsequent communication. Graphically the height of a packet, e.g. 236, corresponds to its bandwidth, and the variations in color/pattern in the packet header, e.g. 238, corresponds to MCS variations therein. The benefit provided by this embodiment of the invention is the higher throughputs associated with omni-dimensional MIMO link optimization with a single such sounding replacing multiple legacy targeted sounding cycles to reduce the latency associated with establishing and maintaining a wireless communication link.

Figure 3A:
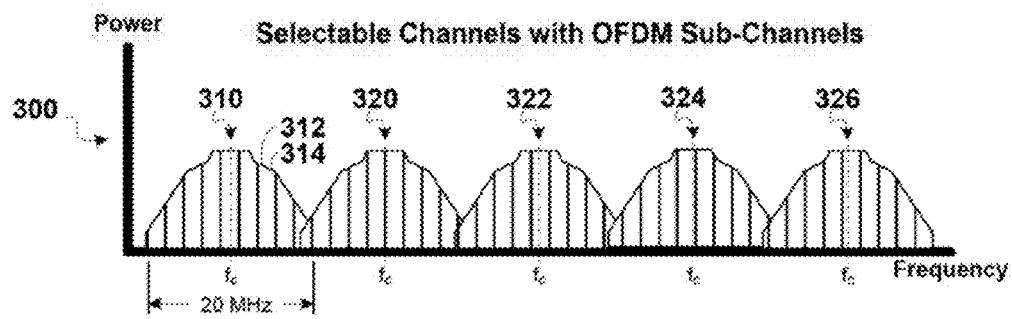
FIGS. 3A, 3B are signal diagrams showing representative selectable orthogonal frequency division multiplexed (OFDM) channels a selected one of which supports communications on the WLAN shown in FIG. 2.
Figure 3B:
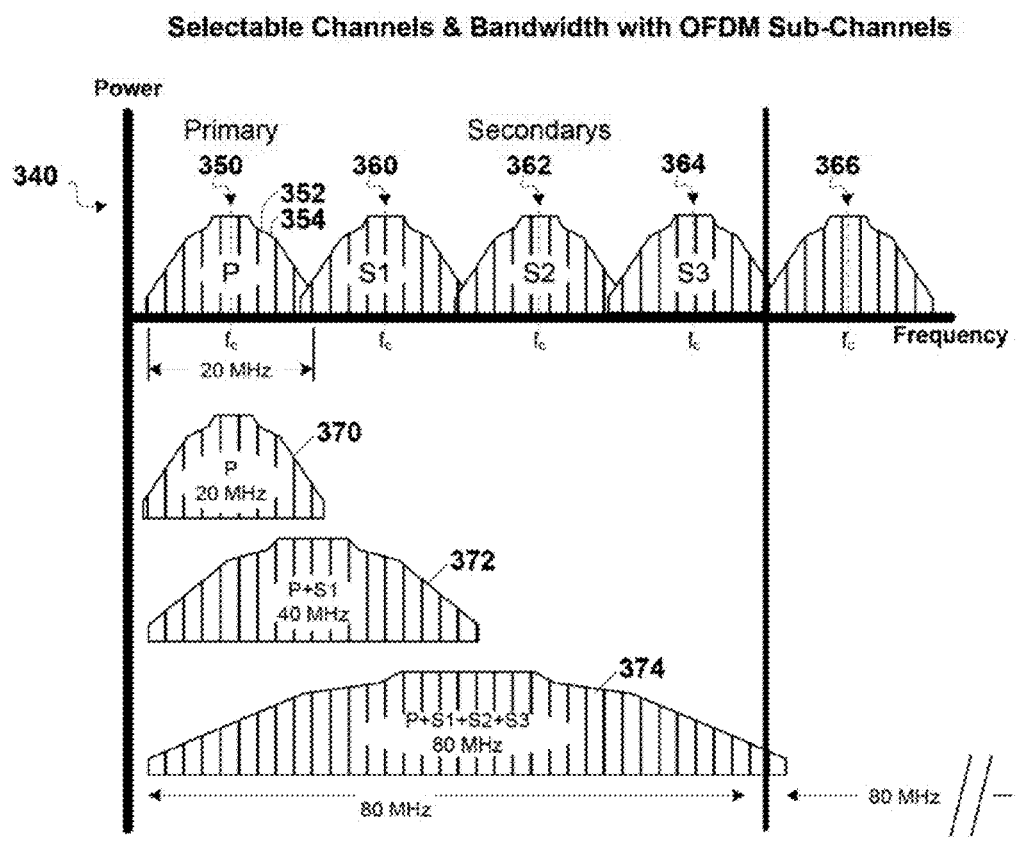

FIGS. 3A, 3B are signal diagrams showing representative selectable orthogonal frequency division multiplexed (OFDM) channels a selected one of which supports communications on the WLAN shown in FIG. 2.

In FIG. 3A the x and y axis of the signal diagram 300 dimension frequency vs. power respectively for the five communication channels, 310, 320, 322, 324, 326. Each communication channel has a fixed bandwidth, e.g. 20 MHz. Each communication channel is orthogonal frequency division multiplexed (OFDM), i.e. divided into sub-channels or tones. Communication channel 310 has sub-channels, e.g. sub-channels 312, 314. This channel layout corresponds to that specified in IEEE 802.11n for example.

In FIG. 3B the x and y axis of the signal diagram 340 dimension frequency vs. power respectively for the OFDM channels. In this case both the channel and the bandwidth of the channel are selectable. After a primary channel is selected, communications bandwidth may be increased by selecting contiguous secondary channels. This channel layout corresponds to that specified in IEEE 802.11ac for example. An 80 MHz channel comprising selectable primary and secondary channels 350, 360, 362, 364 is shown. Channel 350 includes sub-channels/tones 352, 354 for example. Each of selectable channels is fixed in width, e.g. 20 MHz. Also another selectable channel 366 is shown which falls within another 80 MHz channel. Rules for selecting a single primary and for subsequent selection of accompanying secondary(s) are proscribed by the standard. In the example shown, the channel 350 on its own as primary, provides a 20 MHz channel 370. A 40 MHz channel 372 is made by selection of contiguous secondary channel 360. An 80 MHz channel 374 is made by selection of contiguous secondary channels 360, 362, 374. The current invention, is particularly advantageous when applied to link optimization in complex multi-dimensional wireless communications channel schema such as that associated with IEEE 802.11ac as shown in FIG. 3B.

Figures 4A, 4B:
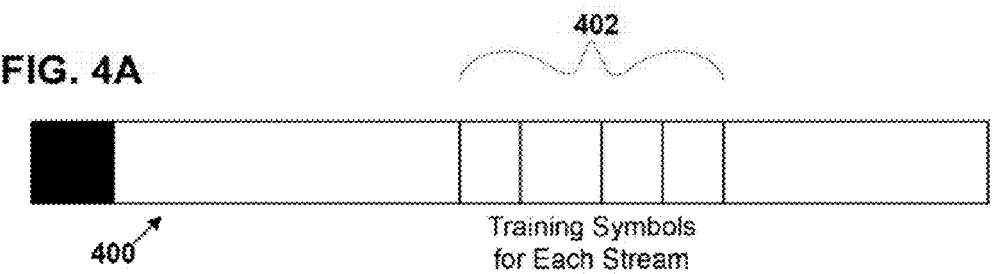
FIGS. 4A-4B are respectively a packet diagram showing a typical sounding packet for determining the characteristics of a channel and a modulation and coding schema table showing representative link adaptation options.

FIGS. 4A-4B are respectively a packet diagram 400 showing a typical sounding packet for determining the characteristics of a channel and a modulation and coding schema (MCS) table 450 showing representative link adaptation options. The typical sounding packet includes one training symbol per stream 402. The typical MCS table includes: options for modulation, coding, and other transmit parameters, for each supported number of spatial streams.

FIG. 5 is a hardware block diagram showing a WLAN node, in this case a wireless access point (WAP) 200 in accordance with an embodiment of the invention which supports omni-dimensional MIMO link optimization. The wireless local area network (WLAN) stage 526 includes four discrete MIMO transceiver paths capable of transmission and reception of from one to four received streams. Only two transmit and two of the receive paths are shown for clarity.

The MIMO transceiver path components include antennas 532A and 532B. The antennas are coupled to radio frequency (RF) module 530 and baseband module 528 of the WLAN stage 526, which implements in an embodiment of the invention the IEEE 802.11* standard for WLAN, with the '*' standing for the particular sub-standard, e.g. a, b, g, n, ac.

A first MIMO receive path originates with the antenna 532A, and includes: low noise amplifier (LNA) 536A, the tunable oscillator 534 and mixer 538A which down converts the received data channel, for filtration by the channel filter 540A, conversion in the analog-to-digital converter (ADC) 542A and domain conversion from the frequency to the time domain in the Discrete Fourier Transform (DFT) module 544A. The corresponding second MIMO receive path components are labeled with the "B" suffix.

In the baseband module 528 the complex coefficients for each sub-channel in each symbol interval are subject to spatial demapping in spatial demapper 546 followed by demapping in the associated one of demappers 548A, 548B. The resultant bits are deinterleaved in the associated one of deinterleavers 550A, 550B. Next the received data is multiplexed in stream multiplexer 552 and decoded and descrambled in the decoder and descrambler 554 which couples to the packet based bus 504.

The transmit path components of two of the four transmit paths in this embodiment of the invention are also shown. The data to be transmitted is encoded and scrambled in the encoder and scrambler 560. It is then demultiplexed into independent data paths one for each antenna in the stream demultiplexer 562. Next data is interleaved and mapped in the associated one of interleavers 564A, 564B and Mappers 566A, 566B. Next the data complex coefficients corresponding to the data are spatially mapped in the spatial mapper 570 using a selected one of the derived MIMO beamforming matrices. Then the mapped coefficients of each sub-channel are transformed from the frequency domain to the time domain in the associated one of inverse discrete Fourier transform (IDFT) modules 572A, 572B.

Next, in the radio frequency module 530 the digital-to-analog (DAC) conversion is accomplished by the associated one of DACs 574A, 574B, followed by filtration by the associated one of channel filters 576A, 576B. then the filtered signals are upconverted in the associated one of upconverters 578A, 578B and amplified by the associated one of power amplifiers 580A, 580B each coupled to an associated one of antennas 532A, 532B for transmission to the receiving device.

The transmit and receive paths couple with and operate under control of the link optimizer 506. The link optimizer includes: a sounding distender 510, a beamform matrix derivation module 508, a memory 512 with tables 514, 516 for each link each including both the associated Omni-dimensional MIMO feedback beamforming matrix as well as the derived beamform matrices associated with same; a link dimension attenuator 518, and a tone indexer 520. An associated storage 522 is also shown, coupled to or integral with the link optimizer.

The sounding distender 510 is coupled to the transmit and receive paths to inject omni-dimensional sounding packets and receive in response omni-dimensional MIMO beamforming packets. In an embodiment of the invention the sounding distender sends from a transmitting one of the nodes to a receiving one of the nodes at least one sounding packet assembled to sound a communication channel link there between exclusively at a maximum number of streams and at a maximum bandwidth supported by the nodes and further receives in response from the receiving one of the nodes a MIMO feedback beamforming matrix or equivalent indicia characterizing the communication channel there between. The sounding distender injects the omni-dimensional sounding packet into the transmit path and specifically in an embodiment of the invention the encoder and scrambler 560 and obtains the responsive MIMO beamforming feedback matrix from the receive path components, and specifically in an embodiment of the invention the decoder and descrambler 554.

In another embodiment of the invention the sounding distender also supports Multi-User MIMO link optimization either by sending a omni-dimensional sounding packet to more than one recipient concurrently or separately and receiving responsive MIMO feedback beamforming matrices from each recipient in response.

In alternate embodiments of the invention the MIMO feedback beamforming matrices include one or more equivalents thereof including but not limited to: a compressed MIMO feedback beamforming matrix; or channel state information (CSI) index. In both the specification and Claims a MIMO feedback beamforming matrix is understood to include such equivalents, e.g. a compressed MIMO feedback beamforming matrix; or channel state information (CSI) index. Also it should be understood in both the specification and the Claims that each MIMO feedback beamforming matrix includes a sub-matrix for each tone or sub-channel across the maximum bandwidth subject to the sounding. Further a MIMO feedback beamforming matrix exhibits a number of rows corresponding to a number of antennas on the transmitting one of the nodes and a number of columns corresponding to a maximum number of streams mutually supported by the transmitting and receiving one of the nodes.

The beamform matrix derivation module 508 couples to the sounding distender and the memories 512. In an embodiment of the invention the beamform matrix derivation module derives from the received MIMO feedback beamforming matrix a set of derived MIMO beamforming matrices having at least a column dimension less than a column dimension in the feedback beamforming matrix. Further these derived MIMO beamforming matrices each exhibit a number of rows less than or equal to a number of rows in the feedback beamforming matrix and a number of columns less than a number of columns in the feedback beamforming matrix.

Where the response to the sounding is a CSI matrix equivalent of the beamforming matrix, the beamform matrix derivation module initially converts the CSI matrix into a MIMO beamforming matrix using a singular value decomposition (SVD) for example.

Where the response to the sounding is a compressed beamform matrix equivalent of the beamforming matrix, containing the rotation angles required to convert the beamforming matrix to a unitary matrix, the beamform matrix derivation module initially performs the required rotations on an identity matrix to 'uncompress' and obtain the MIMO feedback beamforming matrix.

In any event, the beamform matrix derivation module, generates one set of derived MIMO beamforming matrices for each point to point link, e.g. a set for the link between node A to node C and a set for the link between node A and B., where A, B and C are discrete wireless device nodes on the WLAN, e.g. nodes 200, 106, 108, 110 shown in FIG. 2.

In the embodiment of the invention shown in FIG. 5, the output of the beamform derivation module is stored in memory on a per link basis. Each output set of derived beamforming matrices, e.g. set 516, includes the MIMO feedback beamforming matrix, e.g. matrix 514, from which the set was derived. Each set of derived MIMO beamforming matrices, e.g. set 516, is stored in memory 512 in tabular format, specifically in a row order indexed by both a number of transmit antennas and a number of streams, e.g. 4×3, 4×2, 4×1, 3×3, 3×2, 3×1, 2×2, 2×1, 1×1, and in a column order by sub-channel index spanning a maximum available bandwidth, e.g. from tone indices −121 to +121.

In an embodiment of the invention derived MIMO beamforming matrices are generated for various numbers of dimensions given the MIMO feedback beamforming matrix from the beamformee. Let $Q_k$ be the $N_{tx} \times N_{ss}$ matrix that is fed back from the beamformee for the k-th tone, where $N_{tx}$ denotes the number of transmit antenna and $N_{ss}$ denotes the number of dimension that the feedback is requested for. The following equation will provide one method to construct derived beamforming matrices for dimensions from 1 to $N_{ss}-1$. First, let $Q_k(:,1:m)$ denote the first m columns of the MIMO feedback beamforming matrix received from the beamformee in response to the omni-dimensional sounding. The set of derived beamforming matrices for m streams, i.e. $P_k^{(m)}$, where $1 \le m \le N_{ss}-1$, can be obtained as follows:
$P_k^{(m)} = B_k Q_k(:,1:m)$, where $B_k$ is a power normalization diagonal matrix, whose l-th entry is defined as the inverse of the norm of the l-th row in $$Q_k(:,1:m), \text{ i.e. } B_k(l,l) = \frac{1}{\sqrt{\sum_{j=1}^{m} |Q_k(l,j)|^2}}.$$

In another embodiment of the invention the beamform matrix derivation module also supports Multi-User MIMO link optimization by deriving and storing per user sets of derived MIMO beamforming matrices.

The link dimension attenuator 518 couples to the memory 514 and to the transmit path and specifically the spatial mapper 570 thereof. The link dimension attenuator selects at least one of the derived beamforming matrices from the beamform matrix derivation modules memory for transmission of subsequent communication packets from the MIMO transmitter one of the nodes to the recipient one of the nodes, thereby avoiding a requirement for additional channel sounding at either a number of streams or a bandwidth associated with the transmission of subsequent communication packets. Specifically, the link dimension attenuator injects the selected derived beamforming matrix into the spatial mapper for spatially mapping the transmitted stream(s) of data.

The tone indexer 520 couples to the link dimension attenuator and to memory 514 and in an embodiment of the invention is responsive to a request by the link dimension attenuator for a derived beamforming matrix of a specified dimension and bandwidth, to retrieve a corresponding one of the derived beamforming matrices from memory 512 and to re-index the required tones thereof to conform with any lesser included bandwidth requested by the link dimension attenuator.

The associated storage 522 is also shown, coupled to or integral with the link optimizer. In an embodiment of the invention the beamform matrix derivation module stores derived single or multi-user beamforming matrices 524 in storage.

In an embodiment of the invention where the WLAN device 200 comprises a wireless access point (WAP) the device also includes a broadband interface 502 for interfacing with a digital signal line (DSL) or cable modem 500.

FIG. 6 is a process flow diagram of processes associated with WLAN link optimization. In process 600 a determination is made as to common capabilities of the devices/nodes on the link, e.g. maximum mutually supported bandwidth and number of streams. Next in process 602 an omni-dimensional sounding packet is assembled for the maximum number of streams supported by the receiver at the maximum bandwidth mutually supported by the devices/nodes on the link. In process 604 the assembled omni-dimensional sounding packet is transmitted over the link to the receiving node(s).

In process 606 the response from the receiving node is received by the transmitting node. This MIMO feedback beamforming matrix or equivalent indicia such as channel state information (CSI) or compressed beamforming matrix is received along with any per stream signal-to-noise ratios (SNR).

Where the response to the sounding is a CSI matrix equivalent of the beamforming matrix, the CSI matrix is converted into a MIMO beamforming matrix using a singular value decomposition (SVD) for example. Alternately, where the response to the sounding is a compressed beamform matrix equivalent of the beamforming matrix, containing the rotation angles required to convert the beamforming matrix to a unitary matrix, the specified rotations are performed on an identity matrix to 'uncompress' and obtain the MIMO feedback beamforming matrix. Next in process 608 the set of derived MIMO beamforming matrices is derived from the MIMO feedback beamforming matrix. This set of matrices each have at least a column dimension less than a column dimension in the MIMO feedback beamforming matrix; and a row dimension less than or equal to the number of rows in the received MIMO feedback beamforming matrix.

Next a determination is made in decision process 612 as to whether link dimension attenuation is supported. If not, then control passes to process 618. In process 618 link adaptation is conducted with varying combinations of streams and bandwidths for all derived beamforming matrices with varying associated modulation and coding schema (MCS), after which control passes to process 620. Alternately if link dimension attenuation is supported control passes to process 614. In process 614 the optimal stream number and bandwidth is determined based on received SNR for each stream or eigenvalues determined from any received CSI and also based on demand and quality of service (QOS) requirements for the data to be transmitted.

With the CSI feedback, and possible side information (e.g. SNR feedback, path loss estimate, transmit power or some prior MCS usage knowledge), one can reduce the search space including: stream #, bandwidth, modulation and coding classes both across the stream space and within the stream space to more quickly adapt to a time varying channel. Since all feedback types include SNR for various streams, by examining signal to noise ratios (SNR) we can determine how weak or strong each streams are, we can easily decide an appropriate number streams for link adaptation to start with, or even the bit loading for the given number of spatial dimension. For CSI feedback, in addition to the SNR feedback, we can further evaluate the Eigen values across the whole bandwidth and by combining SNR feedback and the Eigenvalue spread an optimal bandwidth choice can be determined based on the demand and the QOS. Next control passes to process 616 in which link adaptation is conducted using the subset of derived matrices associated with the optimal number of streams and the bandwidth(s) determined in the prior step 614.

In either case control then passes to process 620 in which the remaining data is transmitted using the best derived matrix within the set and optimal bandwidth for spatially modulating the transmitted data.

Next control passes to decision process 622 in which a determination is made as to whether the derived feedback beamforming matrices need to be updated with a new omni-dimensional sounding. Such determination can be based on a resettable countdown timer or more intelligently on the basis of channel coherence time or Doppler spread. These measures of the stability of the channel can be determined from any CSI feedback information associated with the MIMO feedback beamforming matrix or from analysis of the reverse channel. This information can be used to reduce the frequency and overhead associated with sounding. If no matrix update is required control returns to process 620 for the transmission of remaining data, or (not shown) transfer of processing to the next "on deck" communication link. Alternately, if a matrix update is required control returns to process 602 for the assembly of the next omni-dimensional sounding packet.

In alternate embodiments of the invention the link optimizer may be part of either or both a WAP or a station without departing from the scope of the Claimed invention.

The components and processes disclosed herein may be implemented a software, hardware, firmware, or a combination thereof, without departing from the scope of the Claimed Invention.

The foregoing description of a preferred embodiment of the invention has been presented for purposes of illustration and description. It is not intended to be exhaustive or to limit the invention to the precise forms disclosed. Obviously many modifications and variations will be apparent to practitioners skilled in this art. It is intended that the scope of the invention be defined by the following claims and their equivalents.

What is claimed is:

1. A link optimizer apparatus for optimizing a link on a wireless local area network (WLAN), supporting wireless communications between a multiple-input multiple-output (MIMO) wireless access point (WAP) node and associated MIMO station nodes on a selected one of a plurality of communication channels; and the link optimizer apparatus comprising:

a processor and a memory configured to provide computer program instructions to the processor;
a sounding distender module configured to send from a transmitting one of the nodes to a receiving one of the nodes at least one sounding packet assembled to sound a communication channel link there between exclusively at a maximum number of streams and at a maximum bandwidth supported by the nodes; and further configured to receive in response from the receiving one of the nodes a MIMO feedback beamforming matrix or equivalent indicia characterizing the communication channel there between and exhibiting a number of rows corresponding to a number of antennas on the transmitting one of the nodes and a number of columns corresponding to a maximum number of streams mutually supported by the transmitting and receiving one of the nodes;
a beamform matrix derivation module configured to derive from the received MIMO feedback beamforming matrix a set of derived MIMO beamforming matrices having at least a column dimension less than a column dimension in the feedback beamforming matrix; and
a link dimension attenuator module configured to select at least one of the derived beamforming matrices from the beamform matrix derivation module for transmission of subsequent communication packets from the MIMO transmitter one of the nodes to the recipient one of the nodes, thereby avoiding a requirement for additional channel sounding at either a number of streams or a bandwidth associated with the transmission of subsequent communication packets.

2. The link optimizer apparatus of claim 1, wherein further the derived MIMO beamforming matrices derived by the beamform matrix derivation module each exhibit a number of rows less than or equal to a number of rows in the feedback beamforming matrix and a number of columns less than a number of columns in the feedback beamforming matrix.

3. The link optimizer apparatus of claim 1, having the link dimension attenuator further configured to target link adaptation exclusively to a subset of the derived beamforming matrices based on signal-to-noise (SNR) indicia received from the receiving one of the nodes together with the MIMO feedback beamforming matrix, thereby attenuating a time interval associated with link adaptation.

4. The link optimizer apparatus of claim 1, further comprising:
a storage coupled to the beamforming matrix derivation module; and
the beamforming matrix derivation module further configured to store the derived beamforming matrices in said storage in a row order indexed by both a number of transmit antennas and a number of streams and in a column order by sub-channel index spanning a maximum available bandwidth.

5. The link optimizer apparatus of claim 1, further comprising:
a storage coupled to the beamforming matrix derivation module for storage of derived beamforming matrices in a row order by matrix dimensions and in column order by sub-channel index spanning a maximum available bandwidth;
a tone indexer coupled to the storage and to the link dimension attenuator and the tone indexer responsive to a request by the link dimension attenuator for a derived beamforming matrix of a specified dimension and bandwidth, to retrieve a corresponding one of the derived beamforming matrices and to re-index the required tones thereof to conform with the bandwidth requested by the link dimension attenuator.

6. The link optimizer apparatus of claim 1, wherein the transmitting one of the nodes comprises a selected one of: a WAP node and a station Node; and the receiving one of the nodes comprises an other of the nodes.

7. A method for improving link performance of a wireless local area network (WLAN) including a multiple-input multiple-output (MIMO) wireless access point node (WAP) and a plurality of MIMO station nodes supporting packet communications with one another on a selected one of a plurality of communication channels; and the method comprising:
sending from a transmitting one of the nodes to a receiving one of the nodes at least one sounding packet assembled to sound a communication channel link there between exclusively at a maximum number of streams and at a maximum bandwidth supported by the nodes;
receiving on the transmitting one of the nodes from the receiving one of the nodes a MIMO feedback beamforming matrix or equivalent indicia characterizing the communication channel there between and exhibiting a number of rows corresponding to a number of antennas on the transmitting one of the nodes and a number of columns corresponding to a maximum number of streams mutually supported by the transmitting and receiving one of the nodes, responsive to the at least one sounding packet;
deriving from the received MIMO feedback beamforming matrix a set of derived MIMO beamforming matrices each having at least a column dimension less than a column dimension in the feedback beamforming matrix; and
selecting at least one of the derived beamforming matrices from the deriving act for transmission of subsequent communication packets from the MIMO transmitter one of the nodes to the recipient one of the nodes, thereby avoiding a requirement for additional channel sounding at either a number of streams or a bandwidth associated with the transmission of subsequent communication packets.

8. The method for improving link performance of claim 7, wherein the derived MIMO beamforming matrices derived in the deriving act each exhibit a number of rows less than or equal to a number of rows in the feedback beamforming matrix and a number of columns less than a number of columns in the feedback beamforming matrix.

9. The method for improving link performance of claim 7, wherein the receiving and deriving acts further comprise:
receiving both signal-to-noise (SNR) indicia for the maximum number of streams supported on the receiving one of the nodes together with the MIMO feedback beamforming matrix in the receiving act;
determining an optimal number of streams for subsequent communications based on the SNR for each stream received in the receiving act; and
targeting link adaptation exclusively to the optimal number of streams determined in the determining act and further to a subset of the derived beamforming matrices having a number of columns equal to the optimal stream count, thereby attenuating a time interval associated with link adaptation.

10. The method for improving link performance of claim 7, wherein the receiving and deriving acts further comprise:
receiving both signal-to-noise (SNR) indicia for the maximum number of streams supported on the receiving one of the nodes together with the MIMO feedback matrix in the receiving act;
determining an optimal number of streams and an optimal bandwidth for subsequent communications based on the SNR for each stream received in the receiving act and quality of service (QOS) requirements and throughput for associated data; and
targeting link adaptation exclusively to the optimal number of streams and optimal bandwidth determined in the determining act and further to a subset of the derived beamforming matrices having a number of columns equal to the optimal stream count, thereby attenuating a time interval associated with link adaptation.

11. The method for improving link performance of claim 7, further comprising:
estimating a channel coherence time based on channel state information in the MIMO feedback beamforming matrix received in the receiving act; and
determining when to repeat the sending act based on the channel coherence time estimated in the estimating act.

12. The method for improving link performance of claim 7, wherein the deriving act further comprises:
storing the derived beamforming matrices in a row order indexed by both a number of transmit antennas and a number of streams and in a column order by sub-channel index spanning a maximum available bandwidth.

13. The method for improving link performance of claim 7, wherein the deriving act further comprises:

storing the derived beamforming matrices for each communication link on the WLAN between the WAP node and a corresponding one of the station nodes, in a row order indexed by both a number of transmit antennas and a number of streams and in a column order by subchannel index spanning a maximum available bandwidth.

14. The method for improving link performance of claim 7, wherein the selecting act further comprises:

re-indexing tones within the memory to conform with a bandwidth requirement established for the selected one of the derived matrices.

15. The method for improving link performance of claim 7, further comprising:

repeating the sending, receiving, deriving and selecting acts for the transmitting one of the nodes and an other receiving one of the nodes, thereby deriving another set of derived MIMO beamforming matrices associated with a link between the transmitting one of the nodes and the other receiving one of the nodes; and spatially combining the derived matrices selected in the selecting acts, for transmission of subsequent Multi-User (MU) MIMO communications from the MIMO transmitter one of the nodes to both the recipient ones of the nodes.

16. The method for improving link performance of claim 7, wherein:

the sending act further comprises sending the at least one sounding packet to both the receiving one of the nodes together with an other receiving one of the nodes;

the receiving act further comprises receiving a corresponding MIMO feedback beamforming matrix from both receiving nodes;

the deriving act further comprises deriving from each of the corresponding MIMO feedback beamforming matrices an associated set of derived MIMO beamforming matrices; and the selecting act further comprises selecting at least one of the derived beamforming matrices from each associated set of derived matrices for precoded transmission of subsequent multi-user (MU) MIMO communication packets from the MIMO transmitter one of the nodes to the recipient ones of the nodes.

17. The method for improving link performance of claim 7, wherein the sending act further comprises:

sending at least one sounding packet conforming with at least one of a group of IEEE communication standards comprising: 802.11n and 802.11ac.

18. The method for improving link performance of claim 7, wherein the transmitting one of the nodes comprises a selected one of: a WAP node and a station Node; and the receiving one of the nodes comprises an other of the nodes.

* * * * *